United States Patent Office 2,725,789
Patented Dec. 6, 1955

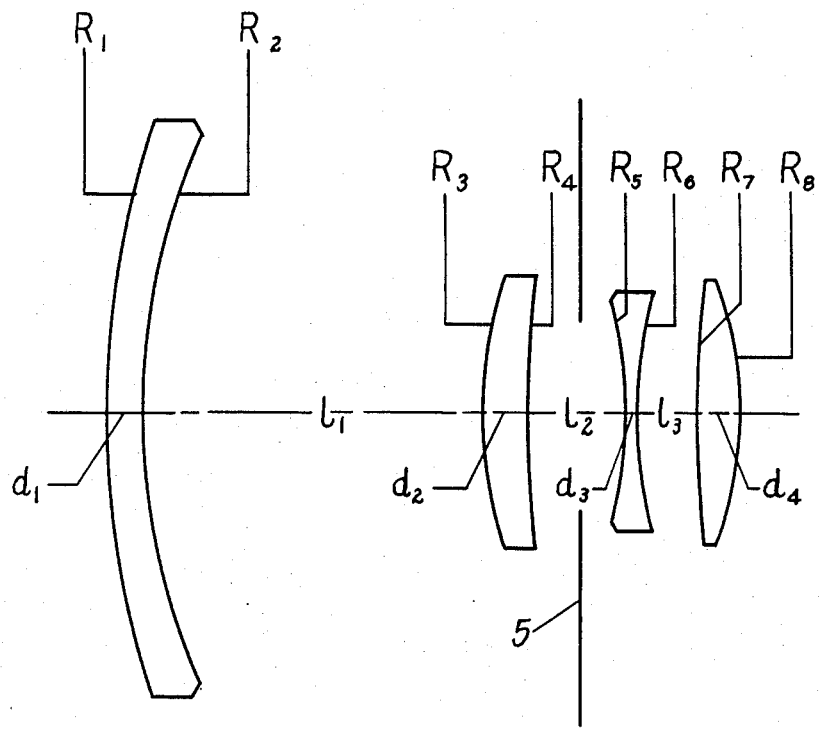

2,725,789

WIDE ANGLE PHOTOGRAPHIC OBJECTIVE

Franz Schlegel, Munich, Germany, assignor to Harry J. Graw, Chicago, Ill.

Application May 27, 1953, Serial No. 357,820

3 Claims. (Cl. 88—57)

My invention relates to a wide angle photographic objective which is corrected for spherical, comatic and chromatic aberrations, astigmatism, field curvature and distortion.

More specifically, the invention relates to a wide angle objective of a type comprising four simple air spaced lens elements, of which the first one, i. e. the one facing the object space, is a dispersive meniscus with its convex surface facing the incident light, while the three following lens components are arranged in conventional triplet manner.

One object of my invention is to provide a wide angle objective having a minimum aperture of F/5.0 covering a field of about 63 degrees and having a back focal length, i. e. the distance between the rear vertex of the objective and the focal plane, of more than 0.95 times the focal length of the objective. The latter makes it possible to mount such an objective of focal length of about 35 mm. in cameras with the shutter arranged immediately behind the rear vertex or in so-called one-lens-reflex-cameras which have a mirror between the rear vertex and the image plane.

In accordance with the present invention the axial air space between the first and second lens elements ranges between 0.20 and 0.45 times the focal length of the objective. In addition, the first lens element is made of a material having an Abbe number distinctly greater than that of the second lens element, the difference ranging between 10 and 25. Also, the refractive index of the second lens element is substantially greater than that of the first lens elements, their difference ranging between 0.10 and 0.25.

The ratio between the absolute values of the radii of the rear and front surfaces of the objective is greater than 2.0 and less than 3.5.

The single figure of the accompanying drawing illustrates a wide angle objective embodying the present invention, and in connection with this figure there is herewith given a practical example of an objective embodying the invention. It is understood that the drawing follows the usual conventions with regard to objectives, light going from left to right, with a radius (R) being positive if the center of curvature is to the right of the lens surface and negative if the center of curvature is to the left of the lens surface.

A diaphragm 5 for the objective is shown located between the opposed surfaces of the second and third lens elements.

In the following example the various distances ($d_1$, $d_2$ and $d_3$, and $l_1$, $l_2$ and $l_3$) are measured axially of the objective. The quantity "$nd$" refers to the index of refraction for the D line for sodium while the letter "$v$" refers to the Abbe number for dispersion.

*Example*

Relative aperture F/4.5.
Focal length 1.00; back focal length 0.99921.

| | | | |
|---|---|---|---|
| $R_1=+0.8600$ | | | |
| $R_2=+0.5550$ | $d_1=0.0350$ | $nd_1=1.51821$ | $v_1=65.2$ |
| $R_3=+0.4000$ | $l_1=0.3300$ | | |
| $R_4=+6.9000$ | $d_2=0.0460$ | $nd_2=1.71700$ | $v_2=47.9$ |
| $R_5=-0.4000$ | $l_2=0.0900$ | | |
| $R_6=+0.4760$ | $d_3=0.0130$ | $nd_3=1.62536$ | $v_3=35.6$ |
| $R_7=+2.5000$ | $l_3=0.0600$ | | |
| $R_8=-0.3223$ | $d_4=0.0500$ | $nd_4=1.62041$ | $v_4=60.3$ |

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A wide angle photographic objective having a minimum aperture of F/5.0 corrected for spherical, comatic and chromatic aberrations, astigmatism, field curvature and distortion, said objective comprising four simple lens elements, the first lens element, i. e. the one facing the object space, being a dispersive meniscus with its convex surface facing the incident light, the successive second, third and fourth lens elements being arranged in conventional triplet manner, the axial air space between the first and second lens elements ranging between 0.20 and 0.45 times the focal length of the objective, the first lens element being made of a material having an Abbe number distinctly greater than that of the second lens element, the difference ranging between 15 and 20, the refractive index of the second lens element being substantially greater than that of the first lens element, the difference ranging between 0.10 and 0.25.

2. A wide angle photographic objective as claimed in claim 1 in which the ratio between the absolute values of the radii of the rear and front surfaces of the objective is greater than 2.0 and less than 3.5.

3. A wide angle photographic objective of focal length 1.00, back focal length 0.99921 and relative aperture F/4.5 having substantially the following numerical data:

| | | | |
|---|---|---|---|
| $R_1=+0.8600$ | | | |
| $R_2=+0.5550$ | $d_1=0.0350$ | $nd_1=1.51821$ | $v_1=65.2$ |
| $R_3=+0.4000$ | $l_1=0.3300$ | | |
| $R_4=+6.9000$ | $d_2=0.0460$ | $nd_2=1.71700$ | $v_2=47.9$ |
| $R_5=-0.4000$ | $l_2=0.0900$ | | |
| $R_6=+0.4760$ | $d_3=0.0130$ | $nd_3=1.62536$ | $v_3=35.6$ |
| $R_7=+2.5000$ | $l_3=0.0600$ | | |
| $R_8=-0.3223$ | $d_4=0.0500$ | $nd_4=1.62041$ | $v_4=60.3$ | where R is the radius of the surface indicated, going from front to rear of the objective, $d$ is axial thickness, $l$ is axial separation, $nd$ is the index of refraction and $v$ is the dispersion number.

References Cited in the file of this patent

UNITED STATES PATENTS

| | | | |
|---|---|---|---|
| 1,862,950 | Ball | June 14, | 1932 |
| 1,934,561 | Rayton | Nov. 7, | 1933 |
| 1,955,590 | Lee | Apr. 17, | 1934 |
| 2,126,126 | Merte | Aug. 9, | 1938 |
| 2,649,022 | Angenieux | Aug. 18, | 1953 |